United States Patent

[15] 3,692,907

Fleming et al.

[45] Sept. 19, 1972

[54] TREATING VIRAL INFECTIONS WITH BIS-BASIC ETHERS AND THIOETHERS OF FLUORENONE AND FLUORENE AND PHARMACEUTICAL COMPOSITONS OF THE SAME

[72] Inventors: Robert W. Fleming, Cincinnati, Ohio 45215; David L. Wenstrup, Covington, Ky. 45318; Edwin R. Andrews, Cincinnati, Ohio 45213

[73] Assignee: Richardson-Merrell, Inc.

[22] Filed: Oct. 27, 1970

[21] Appl. No.: 84,493

Related U.S. Application Data

[63] Continuation-in-part of Ser. No. 788,038, Dec. 30, 1968, Pat. No. 3,592,819.

[52] U.S. Cl. ................424/248, 424/263, 424/267, 424/274, 424/330
[51] Int. Cl. ..........................................A61k 27/00
[58] Field of Search........424/248, 263, 267, 274, 330

[56] References Cited

UNITED STATES PATENTS

| | | | |
|---|---|---|---|
| 1,915,334 | 6/1933 | Salzberg et al. | 260/243 |
| 3,083,201 | 3/1963 | Anderson | 260/268 TR |
| 3,146,259 | 8/1964 | Anderson | 260/268 TR |

OTHER PUBLICATIONS

Chemical Abstracts 62:16159(b), June 1965
The Chemistry of Heterocyclic Compounds, John Wiley and Sons, Interscience Publishers, (1962), " 5-and 6" member comp. w/N/&o, page 229.

*Primary Examiner*—Richard L. Huff
*Attorney*—Eugene O. Retter and George W. Rauchfuss, Jr.

[57] ABSTRACT

Novel pharmaceutical compositions containing bis-basic ethers and thioethers of fluorenone and fluorene selected from a base of the formula

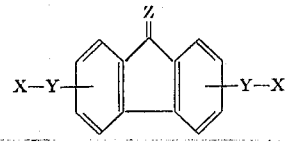

wherein: Z is oxygen or $H_2$; each Y is oxygen or sulfur; and each X is A. the group

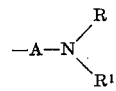

wherein A is alkylene of two to about eight carbon atoms and separates the amino nitrogen thereof and Y by an alkylene chain of at least two carbon atoms, each R and $R^1$ is hydrogen, (lower)alkyl, cycloalkyl of three to six ring carbon atoms, alkenyl of three to six carbon atoms having the vinyl unsaturation in other than the 1-position of the alkenyl group, or each set of R and $R^1$ taken together with the nitrogen to which they are attached is pyrrolidino, piperidino, N-(lower)alkylpiperazino, or morpholino; or B. the group

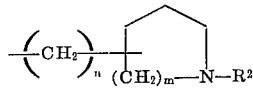

wherein $n$ is an integer of 0 to 2, $m$ is 1 or 2 and $R^2$ is hydrogen, (lower)alkyl, or alkenyl of three to six carbon atoms having the vinyl unsaturation in other than the 1-position of the alkenyl group; or a pharmaceutically acceptable acid addition salt of said base.

These compositions can be used as pharmaceuticals for preventing or inhibiting a viral infection.

32 Claims, No Drawings

TREATING VIRAL INFECTIONS WITH BIS-BASIC ETHERS AND THIOETHERS OF FLUORENONE AND FLUORENE AND PHARMACEUTICAL COMPOSITONS OF THE SAME

CROSS REFERENCE TO RELATED APPLICATIONS

This application is a continuation-in-part of our copending United States patent application Serial No. 788,038, filed on Dec. 30, 1968 and now U.S. Pat. 3,592,891, issued July 13, 1971.

FIELD OF INVENTION

This invention relates to novel pharmaceutical compositions of bis-basic ethers and thioethers of fluorenone and fluorene and use as antiviral agents.

SUMMARY OF INVENTION

The antivirally active compounds of this invention include both the base form and pharmaceutically acceptable acid addition salts of the base form wherein the base form can be represented by the formula

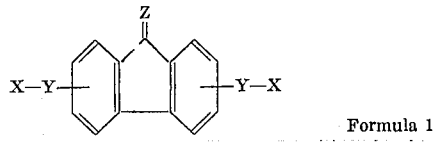

Formula 1 wherein: Z is oxygen or $H_2$; each Y is oxygen or sulfur; and each X is

A. the group

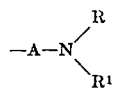

wherein A is alkylene of two to about eight carbon atoms and separates the amino nitrogen thereof and Y by an alkylene chain of at least two carbon atoms, each R and $R^1$ is hydrogen, (lower)alkyl, cycloalkyl of three to six ring carbon atoms, alkenyl of three to six carbon atoms having the vinyl unsaturation in other than the 1-position of the alkenyl group, or each set of R and $R^1$ taken together with the nitrogen to which they are attached is pyrrolidino, piperidino, N-(lower)-alkyl-piperazino, or morpholino; or B. the group

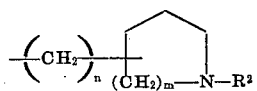

wherein $n$ is an integer of 0 to 2, $m$ is 1 or 2 and $R^2$ is hydrogen, (lower)alkyl, or alkenyl of three to six carbon atoms having the vinyl unsaturation in other than the 1-position of the alkenyl group.

DETAILED DESCRIPTION OF INVENTION

The compounds of this invention can be (a) fluorenones when Z is oxygen; and (b) fluorenes when Z is $H_2$ as can be shown by the following formulas, respectively, wherein Y and X have the meaning given hereinbefore:

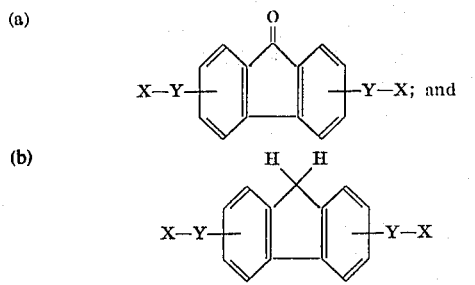

It can be seen that the compounds are ethers when Y is oxygen and thioethers when Y is sulfur. Although one of the two Y groups on a compound of the above Formula 1, or Formulas 2 and 3, given hereinafter, can be oxygen and the other sulfur, it is preferred that both Y groups are the same and particularly that each Y group is oxygen.

The basic ether or thioether groups, that is, —Y—X of Formula 1, can be linked to the tricyclic ring system of the fluorenone or fluorene by replacement of any of the four hydrogens of the benzenoid ring to which such group is attached. Thus, one of these groups can be in any of the positions of 1 through 4 of the tricyclic ring system and the other can be in any of the positions 5 through 8. Preferably, one of the basic ether or thioether groups is in the 2- or 3-position of the tricyclic ring system and the remaining ether or thioether group is in the 5-, 6- or 7-position of the tricyclic ring system and particularly when one of these groups is in the 2-position and the other is in the 7-position.

It can be seen from the above Formula 1 and its description that the compounds can have structures wherein each X is the group

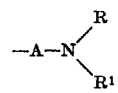

as more fully shown by the following generic Formula 2 or wherein X is the group

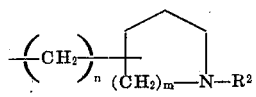

as more fully shown by generic Formula 3 below:

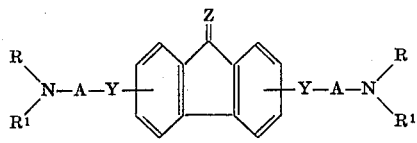

Formula 2; or

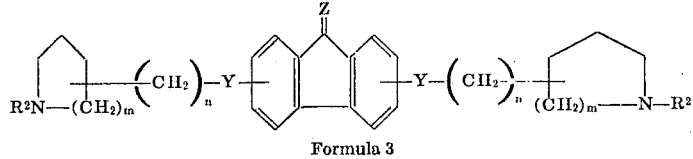

Formula 3

In the above generic Formulas 2 and 3, the various groups have the meanings given hereinbefore, that is, Z is oxygen or $H_2$; each Y is O or S; A is alkylene of two to eight carbon atoms and separates Y and the amino nitrogen by an alkylene chain of at least two carbon atoms and the like.

Each of the letters "A" in the above Formula 2 is an alkylene group having from two to about eight carbon atoms which can be straight chained or branched chained and which separates Y, that is, the ether oxygen or thioether sulfur, from the amino nitrogen by an alkylene chain of at least two carbon atoms, that is, the oxygen (or sulfur) and amino nitrogen are not on the same carbon atom of the alkylene group. Each of the alkylene groups as represented by A can be the same or different. Preferably both of these groups are the same. Illustrative of alkylene groups as represented by A there can be mentioned: 1,2-ethylene; 1,3-propylene; 1,4-butylene; 1,5-pentylene; 1,6-hexylene; 2-methyl-1,4-butylene; 2-ethyl-1,4-butylene; 3-methyl-1,5-pentylene and the like. Preferably, A is alkylene having from two to six carbon atoms.

Each amino group, that is,

of Formula 2, can be a primary, secondary or tertiary amino group. Each of R and $R^1$ can be hydrogen, (lower)alkyl, cycloalkyl of three to six carbon atoms, alkenyl of three to six carbon atoms having the vinyl unsaturation in other than the 1-position of the alkenyl group, or each set of R and $R^1$ taken together with the nitrogen atom to which they are attached is a saturated monocyclic heterocyclic group. Preferably, each of the amino groups as represented by

is a tertiary amino group.

The term (lower)alkyl as used herein relates to alkyls having from one to six carbon atoms. Illustrative of (lower)-alkyls as can be represented by each R or $R^1$ in Formula 2 or $R^2$ in Formula 3 there can be mentioned straight or branched chain alkyls such as methyl; ethyl; n-propyl; isopropyl; n-butyl; secondary butyl; tertiary butyl; isoamyl; n-pentyl; n-hexyl; and the like.

Illustrative of cycloalkyl groups as represented by each of R and $R^1$ there can be mentioned: cyclopropyl; cyclobutyl; cyclopentyl; cyclohexyl; and the like.

Illustrative of alkenyl groups as can be represented by R, $R^1$ or $R^2$, there can be mentioned: allyl; 3-butenyl; 4-hexenyl; and the like.

The heterocyclic groups of each set of R and $R^1$ together with the nitrogen atom to which they are attached can be a saturated monocyclic heterocyclic group such as those generally equivalent to di(lower)alkylamino groups in the pharmaceutical arts. Illustratively, such groups, in addition to the one nitrogen atom, can contain a second hetero atom, that is oxygen, sulfur or nitrogen, in the ring, and four or five ring carbon atoms. The ring can be substituted with a (lower)-alkyl group, particularly such an alkyl group having from one to three carbon atoms. Illustrative of specific heterocyclic groups as represented by R and $R^1$ together with the nitrogen atom to which they are attached, there can be mentioned: piperidino, pyrrolidino, morpholino, N-(lower)alkylpiperazino such as n-methyl OR N-ethylpiperazino, and the like.

Each R, $R^1$ or $R^2$ group can be the same or different on each of the basic ether or thioether groups of the tricyclic ring system. Preferably, however, both of the R groups, $R^1$ groups or $R^2$ groups on each compound are the same. Preferred substituents for the R, $R^1$ and $R^2$ groups are the (lower)-alkyls and particularly (lower)alkyls of one to six carbon atoms.

Each of the saturated heterocyclic groups of the above Formula 3 can be attached to Y through an alkylene linkage of one to two carbon atoms, for example, methylene, or 1,2-ethylene, or the saturated heterocyclic group can be attached to Y through a ring carbon atom of such heterocyclic group when n is zero. The saturated heterocyclic group is attached to the alkylene group or Y through a carbon atom of such ring by replacement of one of the hydrogen atoms of the ring. The heterocyclic groups in the Formula 3 compounds can be 5- or 6-membered rings, that is, m is 1 or 2. The $R^2$ group can be the same as the R or $R^1$ groups of the Formula 2 compounds, except for cycloalkyl or heterocyclic groups. Illustrative of various groups as represented by

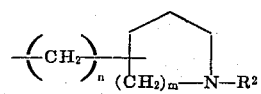

there can be mentioned: N-methyl-4-piperidyl, N-methyl-3-piperidyl, N-ethyl-3-pyrrolidyl, N-methyl-4-piperidylmethyl, N-methyl-3-piperidylmethyl, 2-piperidylethyl, and the like.

Illustrative of base compounds of this invention as represented by generic Formula 2 there can be mentioned: 2,7-bis(4-aminobutoxy)fluoren-9-one; 2,7-bis(4-aminobutylthio)-fluoren-9-one; 3,6-bis[2-(diethylamino)ethoxy]fluoren-9-one; 2,5-bis[3-(diethylamino)propoxy]luoren-9-one; 3,6-bis[3-(dibutylamino)propoxy]luoren-9-one; 2,6-bis[3-(diethylamino)-propoxy]fluoren-9-one; 2,7-bis[5-(dipropylamino)pentoxy]-fluoren-9-one; 3,6-bis[3-(cyclohexylamino)propoxy]9-one; 2,7-bis[6-(diallylamino)hexoxy]fluoren-9-one; 3,6-bis[3-(pyrrolidino)propoxy]fluoren-9-one; 2,7-bis[3-(pyrrolidino)-propylthio]fluoren-9-one; 2,5-bis[2-(N-methyl-N-cyclohexylamino)ethoxy]fluoren-9-one; the corresponding fluorene derivatives of the above enumerated bases; and the like. Illustrative of base compounds of this invention as represented by the generic Formula 3, there can be mentioned: 2,7-bis[2-N-methyl-4-piperidyl)ethoxy]fluoren-9-one; 2,7-bis[2-(N-methyl-4-piperidyl)ethylthio]fluoren-9-one; 3,6-bis(N-methyl-4-piperidyloxy)fluoren-9-one; 2,7-bis(N-ethyl-3-pyrrolidyloxy)-fluoren-9-one; 2,6-bis(N-allyl-4-piperidylmethoxy)fluoren-9-one; the corresponding fluorene derivatives of the above-enumerated bases; and the like.

Preferred compounds of this invention are fluorenones of the formula

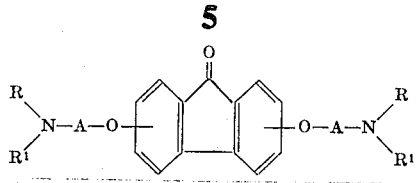

wherein: one of the basic ether groups is in the 2- or 3-position of the fluorenone ring system and the other is in the 5-, 6- or 7-position; each A is alkylene of 2 to 6 carbon atoms and each

group is a tertiary amine as mentioned hereinbefore, particularly when each R and $R^1$ is (lower)alkyl of one to six carbon atoms; and pharmaceutically acceptable acid addition salts thereof.

The compounds of this invention, also simply referred to as active ingredients, can be administered to any suitable host. By "host" we mean viable biological material or intact animals which are capable of inducing the formation of interferon and which can support the replication of a virus. Preferably, the host is animals, such as warm-blooded animals and particularly mammals, for their prophylactic or therapeutic antiviral effects by conventional modes of administration, either alone, but preferably with pharmaceutical carriers. Illustrative of hosts for various viruses there can be mentioned: viable biological material such as can be used in the production of vaccines, for example, tissue cultures, for example, that of kidney, lung or amnion cells, embryos, for example, chick allantoic fluid; and various animals, for example, birds or warm blooded animals such as mammals, including mice, rats, guinea pigs, gerbils and ferrets. Illustratively, administration can be parenterally, for example, subcutaneously, intravenously, intramuscularly or intraperitoneally, or topically, for example, intranasally or intravaginally. Alternatively or concurrently, administration can be by the oral route, a preferred mode of administration, as an interferon inducer.

The dosage administered will be dependent upon the virus for which treatment or prophylaxis is desired, the type of animal involved, its age, health, weight, extent of infection, kind of concurrent treatment, if any, frequency of treatment and the nature of the effect desired. Illustratively, dosage levels of the administered active ingredients can be: intravenously, 0.1 to about 10 mg/kg; intraperitoneal, 0.1 to about 50 mg/kg; subcutaneous, 0.1 to about 250 mg/kg; orally, 0.1 to about 500 mg/kg and preferably about 1 to 250 mg/kg; intranasal instillation, 0.1 to about 10 mg/kg; and aerosol, 0.1 to about 10 mg/kg of animal (body) weight.

The active ingredients, together with pharmaceutical carriers, can be employed in unit dosage forms such as solids, for example, tablets, capsules, powder packets, or liquid solutions, suspensions, or elixirs for oral administration and ingestion or liquid solutions for parenteral use. The quantity of active ingredient in the dosage will generally differ depending on the type of unit dosage, the type of animal, and its weight. Thus, each unit dosage can contain from about 1 milligram (mg) to about 30 grams of active ingredient and preferably from about 25 to 5000 mg. of active ingredient in a pharmaceutical carrier.

The solid unit dosage forms can be of the conventional type. Thus, the solid carrier can be a capsule which can be of the ordinary gelatin type. In the capsule there can be from about 10 to about 90 percent by weight of active ingredient and from 90 to 10 percent of a carrier, for example, lubricant and inert fillers such as lactose, sucrose, corn starch, and the like. In another embodiment, the active ingredient is tabletted with conventional carriers, for example, binders such as acacia, corn starch or gelatin, disintegrating agents such as corn starch, potato starch, or alginic acid, and a lubricant such as stearic acid, or magnesium stearate. In yet another embodiment, the active ingredient is put into powder packets and employed. These solid unit dosages will generally contain from about 5 to 95 percent of the active ingredient by weight of the unit dosage and preferably from about 20 to 90 by weight thereof. The solid unit dosage forms will generally contain from about 1 mg. to about 30 grams of the active ingredient and preferably from about 25 mg. to about 5,000 mg. of the active ingredient.

The pharmaceutical carrier can, as previously indicated, be a sterile liquid such as water and oils, with or without the addition of a surfactant. Illustrative of oils there can be mentioned those of petroleum, animal, vegetable or synthetic origin, for example, peanut oil, soybean oil, mineral oil, sesame oil, and the like. In general, water, saline, aqueous dextrose, and related sugar solutions and glycols such as propylene glycol or polyethylene glycol are preferred liquid carriers, particularly for injectable solutions. Sterile injectable solutions such as saline, for example, isotonic saline, will ordinarily contain from about 0.5 to 25 percent and preferably from about 1 to 10 percent by weight of the active ingredient in the composition.

As mentioned above, oral administration can be in a suitable suspension or syrup, in which the active ingredient ordinarily will constitute from about 0.5 to 10 percent, and preferably from about 1 to 5 percent, by weight. The pharmaceutical carrier in such composition can be a watery vehicle such as an aromatic water, a syrup or a pharmaceutical mucilage; also, a suspending agent for viscosity control such as magnesium aluminum silicate, carboxymethylcellulose or the like as well as a buffer, preservative, and the like.

The active ingredients can also be admixed in animal feed or incorporated into the animal's drinking water. For most purposes, an amount of active ingredient will be used to provide from about 0.0001 to 0.1 percent by weight of the active ingredient based on the total weight of feed intake. Preferably, from 0.001 to 0.02 percent by weight will be used. The selection of the particular feed is within the knowledge of the art and will depend, of course, on the animal, the economics, natural materials available, and the nature of the effect desired.

The active ingredients can be admixed in animal feed concentrates, suitable for preparation and sale to farmers or livestock growers for addition to the animal's feedstuffs in appropriate proportion. These concentrates can ordinarily comprise about 0.5 to about 95 percent by weight of the active ingredient compounded together with a finely divided solid, preferably flours, such as wheat, corn, soya bean and cottonseed. Depending on the recipient animal, the solid adjuvant can be ground cereal, charcoal, fuller's earth, oyster shell and the like. Finely divided attapulgite and bentonite can also be used.

The feed compositions, as well as the feed concentrates, can additionally contain other components of feed concentrates or animal feeds, as will be readily understood. Other particularly important additives include proteins, carbohydrates, fats, vitamins, minerals, antibiotics, and the like.

For use as aerosols the active ingredients can be packaged in a pressurized aerosol container together with a gaseous or liquefied propellant, for example, dichlorodifluoromethane, carbon dioxide, nitrogen, propane, and the like, with the usual adjuvants such as co-solvents, and wetting agents, as may be necessary or desirable.

Typical surface active agents (Kirk and Othmer, *Encyclopedia of Chemical Terminology*, 1954, Vol. 13, page 513), particularly emulsifying and dispersing agents which can be used in the compositions of this invention are, for example, fatty alcohol sulfates such as sodium lauryl sulfate, aliphatic or aromatic sulfonates, such as sulfonated castor oil, and non-ionic types of emulsifying or dispersing agents such as the high molecular weight alkyl polyglycol ethers, such as dodecyl polyglycol ethers containing from about 25 to 75 carbon atoms.

A preferred mode of administration for the compounds (active ingredients) of this invention is parenterally such as by normally liquid injectable compositions, for example, for intramuscular or subcutaneous administration. In such compositions the quantity of active ingredient can vary from about 0.5 to 25 percent by weight of the composition and preferably from about 0.1 to 10 percent by weight. In order to minimize or eliminate irritation at the site of injection, the parenteral compositions can contain a non-ionic surfactant such as those having an HLB (hydrophile-lipophile balance) of about 12 to 17. Such formulations can be solutions, suspensions or emulsions in conventional liquid pharmaceutical carriers, for example, sterile liquids such as water, saline, and aqueous dextrose (glucose) and related sugar solutions. The quantity of surfactant in the formulation can vary from about 5 to 15 percent by weight of the formulation. The quantity of a compound of this invention, either in the base form or a pharmaceutically acceptable acid addition salt in such formulations, can vary over a broad range such as that mentioned hereinbefore, that is, 0.05 to 20 percent by weight of the formulation. Preferably, the active ingredient is in the base form. The remaining component or components of such formulations can be a normally liquid pharmaceutical carrier, for example, isotonic aqueous saline, either alone or together with conventional excipients for injectable compositions. The surfactant can be a single surfactant having the above indicated HLB or a mixture of two or more surfactants wherein such mixture has the indicated HLB. The following surfactants are illustrative of those which can be used in such formulations: (A) Polyoxyethylene derivatives of sorbitan fatty acid esters, such as the TWEEN series of surfactants, for example, TWEEN 80, and the like. The TWEENS are manufactured by Atlas Powder Company. (B) High molecular weight adducts of ethylene oxide with a hydrophobic base formed by the condensation of propylene oxide with propylene glycol, for example, PLURONIC F-68 which is manufactured by Wyandotte Chemical Company. The preferred surfactant is Polysorbate 80, U.S.P., a polyoxyethylene sorbitan monooleate.

Inter alia, the active ingredients induce the formation of interferon when host cells are subjected to such ingredients, for example, contact of an active ingredient with tissue culture or administration to animals. Thus, these active ingredients can be used as antiviral agents for inhibiting or preventing a variety of viral infections susceptible to replication inhibition by interferon induction, by administering such an ingredient to an infected animal, for example, warm-blooded animal, such as a mammal, or to such animal prior to infection. Illustratively, the active ingredients can be administered to prevent or inhibit infections of any virus susceptible to replication inhibition by interferon induction: such as, picornviruses, for example, encephalomyocarditis; myxoviruses, for example, Influenza $A_0$ $PR_8$; arboviruses, for example, Sem-liki Forest; and poxviruses, for example, Vaccinia, IHD. When administered prior to infection, that is, prophylactically, it is preferred that the administration be within 0 to 96 hours prior to infection of the animal with pathogenic virus. When administered therapeutically to inhibit an infection, it is preferred that the administration be within about a day or 2 after infection with pathogenic virus.

The active ingredients of this invention are novel compounds claimed in applicants' copending application, Ser. No. 788,038, filed Dec. 30, 1968 and now U.S. Pat. 3,592,819 issued July 13, 1971, and are prepared by a variety of reactions disclosed therein. The method of preparing the active ingredients of this invention and the specific examples of such preparation as disclosed in said copending application are herein incorporated and made a part of this disclosure by reference thereto.

EXAMPLES

The following examples in which parts and percentages are by weight unless otherwise specified are illustrative of the invention.

EXAMPLE 1

An illustrative composition for a parenteral injection is the following wherein the quantities are on a weight to volume basis.

| | | |
|---|---|---|
| (a) | 2,7-Bis(3-piperidinopropoxy)fluoren-9-one dihydrochloride | 200 mg. |
| (b) | Sodium chloride | q.s. |
| (c) | Water for injection to make | 10 ml. |

The composition is prepared by dissolving the active ingredient and sufficient sodium chloride in water for injection to render the solution isotonic. The composition may be dispensed in a single ampule containing 200 mg. of the active ingredient for multiple dosage or in 10 ampules for a single dosage.

EXAMPLE 2

An illustrative composition for hard gelatin capsules is as follows:

|  | Per Capsule |
| --- | --- |
| (a) 2,7-Bis[2-(diethylamino)ethoxy]fluoren-9-one dihydrochloride | 200 mg. |
| (b) Talc | 35 mg. |

The formulation is prepared by passing the dry powders of (a) and (b) through a fine mesh screen and mixing them well. The powder is then filled into No. 0 hard gelatin capsules at a net fill of 235 mg. per capsule.

EXAMPLE 3

An illustrative composition for tablets is as follows:

|  | Per Tablet |
| --- | --- |
| (a) 2,7-Bis[2-(diethylamino)ethoxy]fluoren-9-one dihydrochloride | 100 mg. |
| (b) Wheat starch | 15 mg. |
| (c) Lactose | 33.5 mg. |
| (d) Magnesium stearate | 1.5 mg. |

Preparation: A granulation obtained upon mixing lactose with the starch and granulated starch paste is dried, screened and mixed with the active ingredient and magnesium stearate. The mixture is compressed in tablets weighing 150 mg. each.

EXAMPLE 4

An illustrative composition for pills is as follows:

|  | Per Pill |
| --- | --- |
| (a) 2,7-Bis[2-(diethylamino)ethoxy]fluoren-9-one dihydrochloride | 100 mg. |
| (b) Starch, corn | 90 mg. |
| (c) Liquid glucose | 10 mg. |

The pills are prepared by blending the active ingredient and starch and then adding the liquid glucose with thorough kneading to form a plastic mass. The pills are then cut and formed from the plastic pill mass.

EXAMPLE 5

A 2 percent weight per volume syrup of 2,7-Bis[2-(diethylamino)-ethoxy]fluoren-9-one dihydrochloride can be prepared by the usual pharmaceutical techniques according to the following formula:

|  | Grams |
| --- | --- |
| (a) 2,7-Bis[2-(diethylamino)ethoxy]fluoren-9-one dihydrochloride | 2.0 |
| (b) Sucrose | 33.3 |
| (c) Chloroform | 0.25 |
| (d) Sodium benzoate | 0.4 |
| (e) Methyl p-hydroxybenzoate | 0.02 |
| (f) Vanillin | 0.04 |
| (g) Glycerol | 1.5 |
| (h) Purified Water to 100.0 ml. | |

EXAMPLE 6

An illustrative composition for hard gelatin capsules is as follows:

|  | Per Capsule |
| --- | --- |
| (a) 2,7-Bis[2-(diethylamino)ethoxy]fluoren-9-one dihydrochloride | 200 mg. |
| (b) Talc | 40 mg. |

The formulation is prepared by passing the dry powders of (a) and (b) through a fine mesh screen and mixing them well. The powder is then filled into No. 0 hard gelatin capsules at a net fill of 240 mg. per capsule.

EXAMPLE 7

2,7-Bis[2-(diethylamino)ethoxy]fluoren-9-one dihydrochloride is mixed with soybean meal to prepare an animal feed concentrate containing 10 grams of said fluorenone compound per pound of the medicated feed. This can subsequently be diluted with a mixed grain ration to give a medicated feed containing 50 milligrams of the fluorenone per pound of the medicated feed.

EXAMPLE 8

The following formulation is illustrative of a dusting powder:

|  | Per Kilogram |
| --- | --- |
| (a) 2-Bis[2-(diethylamino)ethoxy]fluoren-9-one dihydrochloride | 20 grams |
| (b) Silica aerogel | 980 grams |

The dusting powder is prepared by intimately admixing the ingredients. The mixture is then packaged in dispensing containers.

EXAMPLE 9

An illustrative composition for a parenteral injection is the following aqueous emulsion:

| Each ml. contains | Ingredient | Amount |
| --- | --- | --- |
| 50 mg. | 2,7-Bis[2-(diethylamino)ethoxy]-fluoren-9-one dihydrochloride | 1.000 gm. |
| 100 mg. | Polysorbate 80 | 2.000 gm. |
| 0.0064 mg. | Sodium chloride | 0.128 gm. |
|  | Water for injection, q.s. | 20.000 ml. |

The composition of Example 9 is prepared by dissolving 0.64 grams of sodium chloride in 100 ml. of water for injection; mixing the Polysorbate 80 with the active ingredient, adding a sufficient solution of the sodium chloride in water to the active ingredient and Polysorbate to make 20 ml; shaking the mixture; and then autoclaving it for 20 minutes at 110° C. at 15 p.s.i.g. steam pressure. The composition can be dispensed in a single ampule for multiple dosage or in 10 or 20 ampules for single dosages.

The above Examples 1 to 9 illustrate various formulations employing active ingredients of this invention.

Other active ingredients can, of course, be employed in place of that in the above formulations or similar formulations, illustratively, various water soluble acid addition salts, for example, the hydrochloride, hydrobromide, lactate and the like of the following active ingredients can be substituted in the above formulations: 2,7-bis-[2-(dimethylamino)ethoxy]fluoren-9-one; 2,7-bis-[3-(diethylamino)propoxy]fluoren-9-one; 2,7-bis-(2-morpholinoethoxy)fluoren-9-one; 2,7-bis[3-(diethylamino)-ethoxy]fluorene; and the like. Also, particularly when water solubility is not desirable, the active ingredients can be used in the base form.

The following examples, in summary form, are illustrative of the antiviral activity of the active ingredients of this invention.

Examples 10 to 55 illustrate in vivo or in vitro antiviral studies with active ingredients of this invention. Each example recites pertinent information involved. Table I lists the active ingredient which was administered in each of the examples. Although it is believed that the headings in the examples are self-explanatory, some of the headings are explained as follows: The "Challenge", that is, inoculation with a virus, used is generally fatal to all the untreated, that is, control, animals in the experiment. "Time of death" refers to the average time of death for the untreated animals. The "Treatment" was prophylactic or therapeutic or both. The term "volume" refers to the volume of composition administered per dose which contained the active ingredient dissolved in sterile water which also contained 0.15 percent of hydroxyethylcellu-lose. The control animals received a sham dosage of the same volume of the vehicle which did not contain the active ingredient. The abbreviation "STR" is survival time ratio, which is calculated by dividing the mean day of death of the control animals into the mean day of death of the treated animals during the period of observation. The activity of the compound in the example involved is further characterized, for example, low, medium, high, and the like. A survival time ratio (STR) of less than 0.90 indicates that the compound was toxic; a ratio of 0.90 to 1.09 indicates that there is no activity; a ratio of 1.10 to 1.19 indicates low or weak activity; a ratio of 1.20 to 1.29 indicates medium activity; and a ratio of 1.30 and greater indicates high activity.

Table I

| Example No. | Active Ingredient |
|---|---|
| 10–12 | 2,7-Bis[3-(diethylamino)propoxy]fluoren-9-one dihydrochloride. |
| 13–25 | 2,7-Bis[2-(diethylamino)ethoxy]fluoren-9-one dihydrochloride. |
| 26 | 2,7-Bis[3-(di-n-butylamino)propoxy]fluoren-9-one dihydrochloride. |
| 27 | 2,7-Bis[2-(diethylamino)propoxy]fluorene dihydrochloride. |
| 28 | 2,7-Bis[3-(diethylamino)propoxy]fluorene dihydrochloride. |
| 29 | 2,7-Bis[3-(di-n-butylamino)propoxy]fluorene dihydrochloride. |
| 30,31 | 2,7-Bis(3-piperidinopropoxy)fluoren-9-one dihydrochloride. |
| 32 | 2,7-Bis(2-piperidinoethoxy)fluoren-9-one dihydrochloride. |
| 33 | 2,7-Bis[3-(dimethylamino)propoxy]fluoren-9-one dihydrochloride. |
| 34–42 | 2,7-Bis[2-(dimethylamino)ethoxy]fluoren-9-one dihydrochloride. |
| 43,44 | 2,7-Bis[3-(dimethylamino)-2-methylpropoxy]fluoren-9-one dihydrochloride. |
| 45 | 2,7-Bis(2-morpholinoethoxy)fluoren-9-one dihydrochloride. |
| 46 | 2,7-Bis[2-(di-n-butylamino)ethoxy]fluoren-9-one dihydrochloride. |
| 47–49 | 2,7-Bis[2-(ethylmethylamino)ethoxy]fluoren-9-one dihydrochloride. |
| 50,51 | 2,7-Bis[2-(n-butylmethylamino)ethoxy]fluoren-9-one dihydrochloride. |
| 52 | 2,7-Bis(2-pyrrolidinoethoxy)fluoren-9-one dihydrochloride. |
| 53,54 | 2,7-Bis[2-(diisopropylamino)ethoxy]fluoren-9-one dihydrochloride. |
| 55 | 2,7-Bis[2-(di-n-propylamino)ethoxy]fluoren-9-one dihydrochloride. |

| Example No. | 10 | 11 | 12 | 13 |
|---|---|---|---|---|
| Virus | Encephalomyocarditis | Encephalomyocarditis | Vaccinia, IHD | Encephalomyocarditis. |
| Type | RNA, Picornavirus | RNA, Picornavirus | DNA, Poxvirus | RNA, Picornavirus. |
| Challenge | 10 $LD_{50}$ | 18 $LD_{50}$ | 31 $ID_{50}$ | 12 $LD_{50}$. |
| Route | Subcutaneous | Subcutaneous | Subcutaneous in tail | Subcutaneous. |
| Time of death | 5 days | 5 days | Lesion scored on 7th day | 5 days. |
| Period of observation | 10 days | 9 days | | 10 days. |
| Animal | Mice | Mice | Mice | Mice. |
| Weight | 12–15 grams | 12–15 grams | 18–20 grams | 12–15 grams. |
| No. in treated group | 10 | 10 | 10 | 10. |
| No. in control group | 20 | 30 | 20 | 20. |
| Treatment | Prophylactic and therapeutic. | Prophylactic | Prophylactic and therapeutic. | Prophylactic and therapeutic. |
| Dosage level | 50 mg./kg | 250 mg./kg | 50 mg./kg | 50 mg./kg. |
| Route | Subcutaneous | Oral | Subcutaneous | Subcutaneous. |
| Volume | 0.25 ml | 0.25 ml | 0.25 ml | 0.25 ml. |
| Time: | | | | |
| Pre-challenge | 28, 22, 4 hrs | 23 hrs | 28, 22, 4 hrs | 28, 22, 4 hrs. |
| Post-challenge | 2, 20, 26 hrs | None | 2, 20, 26 hrs | 2, 20, 26 hrs. |
| Results: | | | | |
| STR | 1.89 | 1.29 | Lesion score Treated 0.63 / Control 1.6 =0.39 | 2.04. |
| Activity | High | Medium | Medium | High. |

| Example No. | 14 | 15 | 16 | 17 |
|---|---|---|---|---|
| Virus | Encephalomyocarditis | Vaccinia, IHD | Influenza, $A_0$, $PR_8$ | Influenza A, Equine Prague. |
| Type | RNA, Picornavirus | DNA, Poxvirus | RNA, Myxovirus | RNA, Myxovirus. |
| Challenge | 15 $LD_{50}$ | 8 $ID_{50}$ | 4 $LD_{50}$ | 21 $LD_{50}$. |
| Route | Subcutaneous | Subcutaneous in tail | Intranasal | Intranasal. |
| Time of death | 5 days | Tail lesion scored on 7th day. | 7 days | 8 days. |
| Period of observation | 10 days | | 10 days | 10 days. |
| Animal | Mice | Mice | Mice | Mice. |
| Weight | 12–15 grams | 15 grams | 12–15 grams | 12–15 grams. |
| No. in treated group | 10 | 10 | 20 | 20. |
| No. in control group | 10 | 20 | 20 | 20. |
| Treatment | Prophylactic and therapeutic. | Prophylactic and therapeutic. | Prophylactic | Prophylactic. |
| Dosage level | 50 mg./kg | 250 mg./kg | 250 mg./kg | 250 mg./kg. |
| Route | Oral | Oral | Oral | Oral. |
| Volume | 0.25 ml | 0.25 ml | 0.25 ml | 0.25 ml. |
| Time: | | | | |
| Pre-challenge | 28, 22, 2 hrs | 24, 0 hrs | 24 hrs | 24 hrs. |
| Post-challenge | 2, 20, 26 hrs | 24, 48, 72, 96, 120 hrs | None | None. |
| Results: | | | | |
| STR | 1.93 | Lesion score $\frac{\text{Treated } 0.00}{\text{Control } 1.65} = 0.00$ | 1.11 | 1.19. |
| Activity | High | High | Weak | Weak. |

| Example No. | 18 | 19 | 20 | 21 |
|---|---|---|---|---|
| Virus | Influenza B, Lee | Influenza $A_2$, Jap 304 | Semliki Forest | Influenza B, Mass. |
| Type | RNA, Myxovirus | RNA, Myxovirus | RNA, Arbovirus | RNA, Myxovirus. |
| Challenge | 8 $LD_{50}$ | 6.9 $LD_{50}$ | 31 $LD_{50}$ | 10 $LD_{50}$. |
| Route | Intranasal | Intranasal | Subcutaneous | Intranasal. |
| Time of death | 8 days | 6 days | 7 days | 8 days. |
| Period of observation | 10 days | 10 days | 10 days | 10 days. |
| Animal | Mice | Mice | Mice | Mice. |
| Weight | 12–15 grams | 12–15 grams | 12–15 grams | 12–15 grams. |
| No. in treated group | 20 | 18 | 10 | 20. |
| No. in control group | 20 | 20 | 20 | 20. |
| Treatment | Prophylactic | Prophylactic | Prophylactic | Prophylactic. |
| Dosage level | 500 mg./kg | 500 mg./kg | 250 mg./kg | 250 mg./kg. |
| Route | Oral | Oral | Oral | Oral. |
| Volume | 0.25 ml | 0.25 ml | 0.25 ml | 0.25 ml. |
| Time: | | | | |
| Pre-challenge | 24 hrs | 24 hrs | 22 hrs | 24 and 2 hrs. |
| Post-challenge | None | None | None | None. |
| Results: | | | | |
| STR | 1.18 | 1.35 | 1.52 | 1.14. |
| Activity | Weak | High | High | Weak. |

| Example No. | 22 | 23 | 24 | 25 |
|---|---|---|---|---|
| Virus | Influenza A, Equine New Mexico. | Mengo | Vesicular stomatitis | Herpes simplex. |
| Type | RNA, Myxovirus | RNA, Picornavirus | RNA, Arbovirus | DNA, Herpes. |
| Challenge | 13 $LD_{50}$ | 39 $LD_{50}$ | 40 $LD_{50}$ | 63 $LD_{50}$. |
| Route | Intranasal | Subcutaneous | Subcutaneous in tail | Intraperitoneal. |
| Time of death | 7 days | 5 days | Lesion scored on 7th day | Paralysis endpoint 9 days. |
| Period of observation | 10 days | 10 days | | 10 days. |
| Animal | Mice | Mice | Mice | Mice. |
| Weight | 12–15 grams | 12–15 grams | 20 grams | 15 grams. |
| No. in treated group | 10 | 10 | 10 | 20. |
| No. in control group | 20 | 20 | 20 | 20. |
| Treatment | Prophylactic | Prophylactic | Prophylactic | Prophylactic and therapeutic. |
| Dosage level | 250 mg./kg | 250 mg./kg | 250 mg./kg | 250 mg./kg. |
| Route | Oral | Oral | Oral | Oral. |
| Volume | 0.25 ml | 0.25 ml | 0.25 ml | 0.25 ml. |
| Time: | | | | |
| Pre-challenge | 24 hrs | 24 hrs | 24 hrs | 24 and 2 hrs. |
| Post-challenge | None | None | None | 24, 48, 72, 96, 120 and 144 hrs. |
| Results: | | | | |
| STR | 1.15 | 1.82 | Lesion score $\frac{\text{Treated } 0.6}{\text{Control } 1.7} = 0.35$ | 1.17. |
| Activity | Weak | High | Medium | Weak. |

| Example No. | 26 | 27 | 28 | 29 |
|---|---|---|---|---|
| Virus | Encephalomyocarditis | Encephalomyocarditis | Encephalomyocarditis | Encephalomyocarditis. |
| Type | RNA, Picornavirus | RNA, Picornavirus | RNA, Picornavirus | RNA, Picornavirus. |
| Challenge | 12 $LD_{50}$ | 7 $LD_{50}$ | 8 $LD_{50}$ | 13 $LD_{50}$. |
| Route | Subcutaneous | Subcutaneous | Subcutaneous | Subcutaneous. |
| Time of death | 5 days | 5 days | 5 days | 5 days. |
| Period of observation | 10 days | 10 days | 10 days | 10 days. |
| Animal | Mice | Mice | Mice | Mice. |
| Weight | 12–15 grams | 12–15 grams | 12–15 grams | 12–15 grams. |
| No. in treated group | 10 | 10 | 10 | 10. |
| No. in control group | 20 | 30 | 20 | 30. |
| Treatment | Prophylactic and therapeutic. | Prophylactic and therapeutic. | Prophylactic and therapeutic. | Prophylactic and therapeutic. |
| Dosage level | 50 mg./kg | 50 mg./kg | 50 mg./kg | 250 mg./kg. |
| Route | Subcutaneous | Subcutaneous | Subcutaneous | Subcutaneous. |
| Volume | 0.25 ml | 0.25 ml | 0.25 ml | 0.25 ml. |
| Time: | | | | |
| Pre-challenge | 28, 22, 4 hrs | 28, 22, 4 hrs | 28, 22, 4 hrs | 28, 22, 4 hrs. |
| Post-challenge | 2, 20, 26 hrs | 2, 20, 26 hrs | 2, 20, 26 hrs | 2, 20, 26 hrs. |
| Results: | | | | |
| STR | 1.93 | 1.22 | 1.42 | 1.21. |
| Activity | High | Medium | High | Medium. |

| Example No | 30 | 31 | 32 | 33 |
|---|---|---|---|---|
| Virus | Encephalomyocarditis | Encephalomyocarditis | Encephalomyocarditis | Encephalomyocarditis. |
| Type | RNA, Picornavirus | RNA, Picornavirus | RNA, Picornavirus | RNA, Picornavirus. |
| Challenge | 35 $LD_{50}$ | 27 $LD_{50}$ | 10 $LD_{50}$ | 10 $LD_{50}$. |
| Route | Subcutaneous | Subcutaneous | Subcutaneous | Subcutaneous. |
| Time of death | 5 days | 5 days | 5 days | 5 days. |
| Period of observation | 10 days | 10 days | 9 days | 9 days. |
| Animal | Mice | Mice | Mice | Mice. |
| Weight | 12–15 grams | 12–15 grams | 12–15 grams | 12–15 grams. |
| No. in treated group | 10 | 10 | 10 | 10. |
| No. in control group | 30 | 29 | 30 | 30. |
| Treatment | Prophylactic and therapeutic. | Prophylactic | Prophylactic | Prophylactic and therapeutic. |
| Dosage level | 50 mg./kg | 250 mg./kg | 50 mg./kg | 50 mg./kg. |
| Route | Subcutaneous | Oral | Oral | Subcutaneous. |
| Volume | 0.25 ml | 0.25 ml | 0.25 ml | 0.25 ml. |
| Time: | | | | |
| Pre-challenge | 28, 22, 2 hrs | 24 hrs | 28 and 22 hrs | 28, 22, 2 hrs. |
| Post-challenge | 2, 20, 26 hrs | None | None | 2, 20, 26 hrs. |
| Results: | | | | |
| STR | 1.55 | 1.23 | 1.26 | 1.93. |
| Activity | High | Medium | Medium | High. |

| Example No | 34 | 35 | 36 | 37 |
|---|---|---|---|---|
| Virus | Encephalomyocarditis | Encephalomyocarditis | Mengo | Vaccinia IHD. |
| Type | RNA, Picornavirus | RNA, Picornavirus | RNA, Picornavirus | DNA, Poxvirus. |
| Challenge | 52 $LD_{50}$ | 52 $LD_{50}$ | 39 $LD_{50}$ | 25 $ID_{50}$. |
| Route | Subcutaneous | Subcutaneous | Subcutaneous | Subcutaneous in tail. |
| Time of death | 5 days | 5 days | 5 days | Tail lesion scored. |
| Period of observation | 9 days | 9 days | 10 days | Tail lesion scored on 7th day. |
| Animal | Mice | Mice | Mice | Mice. |
| Weight | 12–15 grams | 12–15 grams | 12–15 grams | 20 grams. |
| No. in treated group | 10 | 10 | 10 | 10. |
| No. in control group | 20 | 20 | 20 | 20. |
| Treatment | Prophylactic and therapeutic. | Prophylactic | Prophylactic | Prophylactic. |
| Dosage level | 50 mg./kg | 250 mg./kg | 250 mg./kg | 250 mg./kg. |
| Route | Subcutaneous | Oral | Oral | Oral. |
| Volume | 0.25 ml | 0.25 ml | 0.25 ml | 0.25 ml. |
| Time: | | | | |
| Pre-challenge | 28, 22, 2 hrs | 24 hrs | 24 hrs | 24 and 2 hrs. |
| Post-challenge | 2 hrs | None | None | None. |
| Results: | | | | |
| STR | 1.85 | 2.04 | 1.88 | Lesion score $\frac{\text{Treated } 0.9}{\text{Control } 1.7}=0.53$ |
| Activity | High | High | High | Weak. |

| Example No | 38 | 39 | 40 | 41 |
|---|---|---|---|---|
| Virus | *Vesicular stomatitis* | Semliki Forest | Influenza A, Equine New Mexico. | Influenza B, Mass. |
| Type | RNA, Arbovirus | RNA, Arbovirus | RNA, Myxovirus | RNA, Myxovirus. |
| Challenge | 40 $ID_{50}$ | 3.2 $LD_{50}$ | 13 $LD_{50}$ | 10 $LD_{50}$. |
| Route | Subcutaneous in tail | Subcutaneous | Intranasal | Intranasal. |
| Time of death | Tail lesions scored on 7th day. | 5 days | 7 days | 8 days. |
| Period of observation | | 10 days | 10 days | 10 days. |
| Animal | Mice | Mice | Mice | Mice. |
| Weight | 20 grams | 12–15 grams | 12–15 grams | 12–15 grams. |
| No. in treated group | 10 | 10 | 10 | 20. |
| No. in control group | 20 | 20 | 20 | 20. |
| Treatment | Prophylactic | Prophylactic | Prophylactic | Prophylactic. |
| Dosage level | 250 mg./kg | 250 mg./kg | 250 mg./kg | 250 mg./kg. |
| Route | Oral | Oral | Oral | Oral. |
| Volume | 0.25 ml | 0.25 ml | 0.25 ml | 0.25 ml. |
| Time: | | | | |
| Pre-challenge | 24 hours | 24 hrs | 24 hrs | 24 and 2 hrs. |
| Post-challenge | None | None | None | None. |
| Results: | | | | |
| STR | Lesion score $\frac{\text{Treated } 0.3}{\text{Control } 1.7}=0.18$ | 1.39 | 1.12 | 1.25. |
| Activity | High | High | Weak | Medium. |

| Example No | 42 | 43 | 44 | 45 |
|---|---|---|---|---|
| Virus | Influenza $A_2$, Jap 305 | Encephalomyocarditis | Encephalomyocarditis | Encephalomyocarditis. |
| Type | RNA, Myxovirus | RNA, Picornavirus | RNA, Picornavirus | RNA, Picornavirus. |
| Challenge | 13 $LD_{50}$ | 7 $LD_{50}$ | 7 $LD_{50}$ | 7 $LD_{50}$. |
| Route | Intranasal | Subcutaneous | Subcutaneous | Subcutaneous. |
| Time of death | 6 days | 5 days | 5 days | 5 days. |
| Period of observation | 10 days | 9 days | 9 days | 9 days. |
| Animal | Mice | Mice | Mice | Mice. |
| Weight | 12–15 grams | 12–15 grams | 12–15 grams | 12–15 grams. |
| No. in treated group | 9 | 10 | 10 | 10. |
| No. in control group | 10 | 30 | 30 | 30. |
| Treatment | Prophylactic | Prophylactic and therapeutic. | Prophylactic | Prophylactic and therapeutic. |
| Dosage level | 250 mg./kg | 50 mg./kg | 250 mg./kg | 50 mg./kg. |
| Route | Oral | Subcutaneous | Oral | Subcutaneous. |
| Volume | 0.25 ml | 0.25 ml | 0.25 ml | 0.25 ml. |
| Time: | | | | |
| Pre-challenge | 24 and 2 hours | 28, 22, 2 hrs | 22 hrs | 28, 22, 2 hrs. |
| Post-challenge | None | 2 hrs | None | 2 hrs. |
| Results: | | | | |
| STR | 1.31 | 1.25 | 1.15 | 1.13. |
| Activity | High | Medium | Weak | Weak. |

| Example No. | 46 | 47 | 48 | 49 |
|---|---|---|---|---|
| Virus | Encephalomyocarditis | Encephalomyocarditis | Encephalocarditis | Influenza B, Mass. |
| Type | RNA, Picornavirus | RNA, Picornavirus | RNA, Picornavirus | RNA, Myxovirus. |
| Challenge | 6 $LD_{50}$ | 6 $LD_{50}$ | 6 $LD_{50}$ | 20 $LD_{50}$. |
| Route | Subcutaneous | Subcutaneous | Subcutaneous | Intranasal. |
| Time of death | 5 days | 5 days | 5 days | 8 days. |
| Period of observation | 9 days | 9 days | 9 days | 10 days. |
| Animal | Mice | Mice | Mice | Mice. |
| Weight | 12–15 grams | 12–15 grams | 12–15 grams | 12–15 grams. |
| No. in treated group | 10 | 10 | 10 | 10. |
| No. in control group | 20 | 20 | 20 | 10. |
| Treatment | Prophylactic | Prophylactic | Prophylactic | Prophylactic. |
| Dosage level | 250 mg./kg | 50 mg./kg | 50 mg./kg | 250 mg./kg. |
| Route | Subcutaneous | Subcutaneous | Oral | Oral. |
| Volume | 0.25 ml | 0.25 ml | 0.25 ml | 0.25 ml. |
| Time: | | | | |
| Pre-challenge | 28, 22, 2 hrs | 22 hrs | 22 hrs | 24 hrs. |
| Post-challenge | None | None | None | None. |
| Results: | | | | |
| STR | 1.43 | 1.47 | 1.14 | 1.26. |
| Activity | High | High | Weak | Medium. |

| Example No. | 50 | 51 | 52 |
|---|---|---|---|
| Virus | Encephalomyocarditis | Encephalomyocarditis | Encephalomyocarditis. |
| Type | RNA, Picornavirus | RNA, Picornavirus | RNA, Picornavirus. |
| Challenge | 27 $LD_{50}$ | 27 $LD_{50}$ | 12 $LD_{50}$. |
| Route | Subcutaneous | Subcutaneous | Subcutaneous. |
| Time of death | 5 days | 5 days | 5 days. |
| Period of observation | 9 days | 9 days | 9 days. |
| Animal | Mice | Mice | Mice. |
| Weight | 12–15 grams | 12–15 grams | 12–15 grams. |
| No. in treated group | 10 | 10 | 10. |
| No. in control group | 20 | 20 | 20. |
| Treatment | Prophylactic | Prophylactic | Prophylactic. |
| Dosage level | 250 mg./kg | 250 mg./kg | 250 mg./kg. |
| Route | Subcutaneous | Oral | Oral. |
| Volume | 0.25 ml | 0.25 ml | 0.25 ml. |
| Time: | | | |
| Pre-challenge | 28 hrs | 22 hrs | 22 hrs. |
| Post-challenge | None | None | None. |
| Results: | | | |
| STR | 1.30 | 1.17 | 1.70. |
| Activity | High | Weak | High. |

| Example No. | 53 | 54 | 55 |
|---|---|---|---|
| Virus | Encephalomyocarditis | Encephalomyocarditis | Encephalomyocarditis. |
| Type | RNA, Picornavirus | RNA, Picornavirus | RNA, Picornavirus. |
| Challenge | 18 $LD_{50}$ | 18 $LD_{50}$ | 15 $LD_{50}$. |
| Route | Subcutaneous | Subcutaneous | Subcutaneous |
| Time of death | 4.4 days | 4.4 days | 4.7 days. |
| Period of observation | 9 days | 9 days | 9 days. |
| Animal | Mice | Mice | Mice. |
| Weight | 12–15 grams | 12–15 grams | 12–15 grams. |
| No. in treated group | 10 | 10 | 10. |
| No. in control group | 30 | 30 | 20. |
| Treatment | Prophylactic and therapeutic | Prophylactic and therapeutic | Prophylactic and therapeutic. |
| Dosage level | 50 mg./kg | 50 mg./kg | 50 mg./kg. |
| Route | Subcutaneous | Oral | Subcutaneous. |
| Volume | 0.25 ml | 0.25 ml | 0.25 ml. |
| Time: | | | |
| Pre-challenge | 28, 22, 2 hrs | 28, 22, 2 hrs | 28, 22, 2 hrs. |
| Post-challenge | 2 hrs | 2 hrs | 2 hrs. |
| Results: | | | |
| STR | 1.55 | 1.66 | 1.26. |
| Activity | High | High | Medium. |

EXAMPLE 56

This example indicates antiviral activity of 2,7-Bis[2-(diethylamino)ethoxy]fluoren-9-one dihydrochloride in mice against Semliki Forest virus infections by various routes of administration. CF–1 male mice, 15 to 18 grams were used in groups ranging from 10 to 30 animals in number. The active ingredient was administered in a single dose either in aqueous solution or in 0.15 percent hydroxyethylcellulose either orally, subcutaneously or intraperitoneally as indicated. The active ingredient was administered 24 hours prior to subcutaneous inoculation of 27 $LD_{50}$'s of virus. In Table II, following, the mg/kg dosage range for each route of administration is followed by the mean day of death, which is an expression of the survival time and the percent survivors. The data show a high degree of antiviral activity for all routes of treatment.

TABLE II

EFFECT OF SINGLE ORAL, SUBCUTANEOUS AND INTRAPERITONEAL PROPHYLACTIC DOSES OF 2,7BIS[2-(DIETHYLAMINO)-ETHOXY]FLUOREN-9-ONE DIHYDROCHLORIDE ON SEMLIKI FOREST VIRUS INFECTIONS (27 $LD_{50}$) IN MICE

| Route of administration 24 hours pre-inoculation | mg/kg | mean day of death | Percent Survivors |
|---|---|---|---|
| Oral | 250 | 11.0* | 100 |
| | 100 | 10.9 | 90 |
| | 50 | 9.2 | 20 |
| | 10 | 8.8 | 20 |
| | 0 | 7.6 | 0 |
| Subcutaneous | 100 | 10.6 | 80 |
| | 50 | 8.2 | 20 |
| | 10 | 6.3 | 0 |
| | 0 | 6.6 | 0 |
| Intraperitoneal | 100 | 11.0 | 100 |
| | 50 | 10.4 | 70 |
| | 10 | 8.4 | 10 |
| | 0 | 8.1 | 0 |

* Maximal Mean Day of Death

In similar type tests with neurotropic virus infections, for example, encephalomyocarditis virus, respiratory myxovirus infections, for example, A₂(Jap/305) and B/Massachusetts influenza viruses, and dermatropic virus infections, for example, vesticular stomatitis and vaccine produced similar type antiviral activity.

We claim:

1. A method for inhibiting viral infections susceptible to replication inhibition by interferon which comprises administering within an antivirally effective time period to a host having cells susceptible to invasion by such pathogenic viral agents an antivirally effective amount of a base compound of the formula

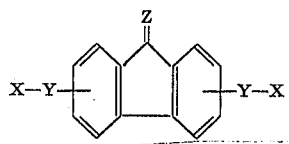

wherein: Z is oxygen or H₂; each Y is oxygen or sulfur; and each X is identical and is A. the group

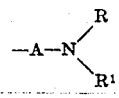

wherein A is alkylene of two to eight carbon atoms and separates the amino nitrogen thereof and Y by an alkylene chain of at least 2 carbon atoms, each R and R¹ is hydrogen, (lower)alkyl, cycloalkyl of three to six ring carbon atoms, alkenyl of three to six carbon atoms having the vinyl unsaturation in other than the 1-position of the alkenyl group, or each set of R and R¹ taken together with the nitrogen to which they are attached is pyrrolidino, piperidino, N-(lower)alkylpiperazino, or morpholino; or B. the group

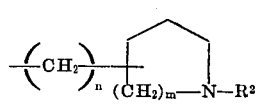

wherein $n$ is an integer of 0 to 2, $m$ is 1 or 2 and R² is hydrogen, (lower)alkyl, or alkenyl of three to six carbon atoms having the vinyl unsaturation in other than the 1-position of the alkenyl group; or a pharmaceutically acceptable acid addition salt of said base compound.

2. A method of claim 1 wherein the antivirally effective amount is from about 0.1 to about 500 milligrams per kilogram of host body weight.

3. A method of claim 1 wherein the host is a warm blooded animal of mammalian origin.

4. A method of claim 1 wherein Z and Y of the formula are both oxygen.

5. A method of claim 4 wherein the radicals —Y—X are attached to the 2 and 7 positions of the fluorenone nucleus.

6. A method of claim 5 wherein X is

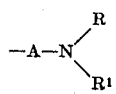

wherein A is alkylene of two to six carbon atoms and R and R¹ are alkyl of one to six carbon atoms.

7. A method of claim 6 wherein the host is a warm blooded animal of mammalian origin.

8. A method of claim 6 wherein the compound is 2,7-bis-[2-(diethylamino)ethoxy]fluoren-9-one or a pharmaceutically acceptable acid addition salt thereof.

9. A method of claim 8 wherein the compound is administered orally to the host.

10. A method of claim 8 wherein the host is a warm blooded animal of mammalian origin.

11. A method of claim 1 wherein the is 2,7-bis-[3-(dimethylamino)propoxy]fluoren-9-one or a pharmaceutically acceptable acid addition salt thereof.

12. A method of claim 1 wherein the compound is 2,7-bis-[2-(dimethylamino)ethoxy]fluoren-9-one or a pharmaceutically acceptable acid addition salt thereof.

13. A method of claim 1 wherein the compound is 2,7-bis-(3-piperidinopropoxy)fluoren-9-one or a pharmaceutically acceptable acid addition salt thereof.

14. A method of claim 1 wherein the compound is 2,7-bis-[2-(diisopropylamino)ethoxy]fluoren-9-one or a pharmaceutically acceptable acid addition salt thereof.

15. A method of claim 1 wherein the compound is 2,7-bis-[2-(n-butylamino)ethoxy]fluoren-9-one or a pharmaceutically acceptable acid addition salt thereof.

16. A method of claim 1 wherein the administration of the compound to the host is by oral administration.

17. A method of claim 1 wherein the compound is administered to the host for prophylactic treatment of the host against said viral infections.

18. A method of claim 1 which comprises administering said compound to a warm blooded animal of mammalian origin infected with a viral infection susceptible to viral replication inhibition by interferon.

19. A method of claim 18 wherein Z and Y of the formula are both oxygen.

20. A method of claim 19 wherein the radicals —Y—X are attached at the 2 and 7 positions of the fluorenone nucleus.

21. A method of claim 20 wherein X is

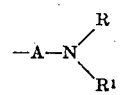

wherein A is alkylene of 2 to 6 carbon atoms and R and R¹ are alkyl of 1 to 6 carbon atoms.

22. A method of claim 21 wherein the compound is 2,7-bis-[2-(diethylamino)ethoxy]fluoren-9-one or a pharmaceutically acceptable acid addition salt thereof.

23. A pharmaceutical composition for inhibiting viral infections, in unit dosage form, comprising a significant quantity of a sterile pharmaceutical carrier and from about 25 milligrams to about 30 grams of a compound of the formula

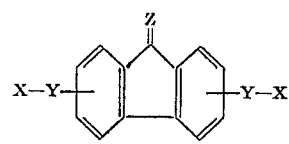

wherein: Z is oxygen or H₂; each Y is oxygen or sulfur; and each X is identical and is A. the group

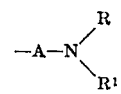

wherein A is alkylene of two to eight carbon atoms and separates the amino nitrogen thereof and Y by an alkylene chain of at least two carbon atoms, each R and R¹ is hydrogen, (lower)alkyl, cycloalkyl of three to six ring carbon atoms, alkenyl of three to six carbon atoms having the vinyl unsaturation in other than the 1-position of the alkenyl group, or each set of R and R¹ taken together with the nitrogen to which they are attached is pyrrolidino, piperidino, N-(lower)alkylpiperazino, or morpholino; or B. the group

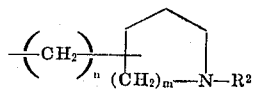

wherein $n$ is an integer of 0 to 2, $m$ is 1 or 2 and $R^2$ is hydrogen, (lower)alkyl, or alkenyl of three to six carbon atoms having the vinyl unsaturation in other than the 1-position of the alkenyl group;
or a pharmaceutically acceptable acid addition salt of said base compound.

24. A pharmaceutical composition of claim 23 wherein Z and Y of the formula are oxygen; the radicals —Y—X are attached at the 2 and 7 positions of the fluorenone nucleus; and X is

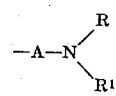

wherein A is alkylene of two to six carbon atoms and R and R¹ are alkyl of one to six carbon atoms.

25. A pharmaceutical composition of claim 24 wherein the compound is 2,7-bis[2-(diethylamino)ethoxy]fluoren-9-one or a pharmaceutically acceptable acid addition salt thereof.

26. A pharmaceutical composition of claim 23 which is a normally liquid parenterally injectable pharmaceutical composition comprising 5 to 15 percent by weight of a non-ionic surfactant having an HLB of from about 12 to 17; a significant quantity of a sterile, normally liquid pharmaceutical carrier; and from about 0.05 to about 20 percent by weight of the fluorenone compound.

27. A pharmaceutical composition of claim 26 wherein the fluorenone compound is 2,7-bis[2-(diethylamino)ethoxy]-fluoren-9-one or a pharmaceutically acceptable acid addition salt thereof.

28. An animal feed composition for inhibiting viral infections comprising a mixture of a feedstuff and from about 0.001 to about 0.02 percent by weight of said composition of a compound of the formula

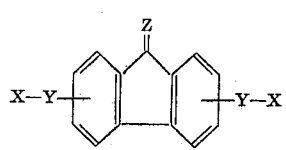

wherein: Z is oxygen or $H_2$; each Y is oxygen or sulfur; and each X is identical and is
A. the group

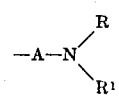

wherein A is alkylene of two to eight carbon atoms and separates the amino nitrogen thereof and Y by an alkylene chain of at least two carbon atoms, each R and R¹ is hydrogen, (lower)alkyl, cycloalkyl of three to six ring carbon atoms, alkenyl of three to six carbon atoms having the vinyl unsaturation in other than the 1-position of the alkenyl group, or each set of R and R¹ taken together with the nitrogen to which they are attached is pyrroli-dino, piperidino, N-(lower)alkylpiperazino, or morpholino; or B. the group

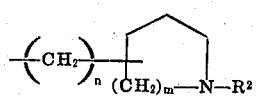

wherein $n$ is an integer of 0 to 2, $m$ is 1 or 2 and $R^2$ is hydrogen, (lower)alkyl, or alkenyl of three to six carbon atoms having the vinyl unsaturation in other than the 1-position of the alkenyl group;
or a pharmaceutically acceptable acid addition salt of said base compound.

29. An animal feed composition of claim 28 wherein the compound is 2,7-bis[2-(diethylamino)ethoxy]fluoren-9-one or a pharmaceutically acceptable acid addition salt thereof.

30. An animal feed concentrate for inhibiting viral infections comprising a mixture of a feedstuff and from about 0.5 to about 95 percent by weight of said composition of a compound of the formula

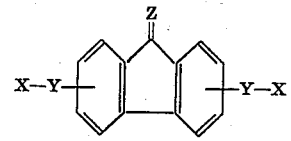

wherein: Z is oxygen or $H_2$; each Y is oxygen or sulfur; and each X is identical and is
A. the group

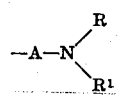

wherein A is alkylene of two to eight carbon atoms and separates the amino nitrogen thereof and Y by an alkylene chain of at least two carbon atoms, each R and R¹ is hydrogen, (lower)alkyl, cycloalkyl of three to six ring carbon atoms, alkenyl of three to six carbon atoms having the vinyl unsaturation in other than the 1-position of the alkenyl group, or each set of R and R¹ taken together with the nitrogen to which they are attached is pyrrolidino, piperidino, N-(lower)alkylpiperazino, or morpholino; or B. the group

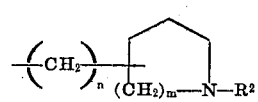

wherein $n$ is an integer of 0 to 2, $m$ is 1 or 2 and $R^2$ is hydrogen, (lower)alkyl, or alkenyl or 3 to 6 carbon atoms having the vinyl unsaturation in other than the 1-position of the alkenyl group;
or a pharmaceutically acceptable acid addition salt of said base compound.

31. An animal feed concentrate of claim 30 wherein the compound is 2,7-bis[2-(diethylamino)ethoxy]fluoren-9-one or a pharmaceutically acceptable acid addition salt thereof.

32. A method of inhibiting viral infections susceptible to replication inhibition by interferon which comprises administering to a host which is viable mammalian biological material apart from the intact animal having cells susceptible to invasion by such viral agents, an effective amount of a base compound of the formula

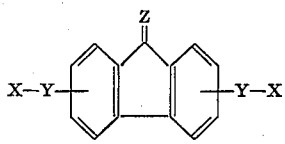

wherein: Z is oxygen or $H_2$; each Y is oxygen or sulfur; and each X is identical and is A. the group

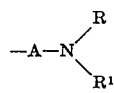

wherein A is alkylene of two to eight carbon atoms and separates the amino nitrogen thereof and Y by an alkylene chain of at least two carbon atoms, each R and $R^1$ is hydrogen, (lower)alkyl, cycloalkyl of three to six ring carbon atoms, alkenyl of three to six carbon atoms having the vinyl unsaturation in other than the 1-position of the alkenyl group, or each set of R and $R^1$ taken together with the nitrogen to which they are attached is pyrrolidino, piperidino, N-(lower)alkylpiperazino, or morpholino; or B. the group

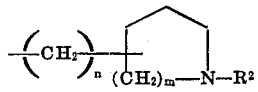

wherein $n$ is an integer of 0 to 2, $m$ is 1 or 2 and $R^2$ is hydrogen, (lower)alkyl, or alkenyl of three to six carbon atoms having the vinyl unsaturation in other than the 1-position of the alkenyl group; or a pharmaceutically acceptable acid addition salt of said base compound.

* * * * *

UNITED STATES PATENT AND TRADEMARK OFFICE
CERTIFICATE OF CORRECTION

PATENT NO. : 3,692,907

DATED : September 19, 1972

INVENTOR(S) : Robert W. Fleming, David L. Wenstrup and Edwin R. Andrews

It is certified that error appears in the above-identified patent and that said Letters Patent are hereby corrected as shown below:

Column 1, line 10, "3,592,891" should read "3,592,819".

Column 4, line 19, "one to two" should read "one or two"; line 50, "propoxy]9-one" should read "propoxy]fluorin-9-one". Column 6, line 20, "about 20 to 90 by weight" should read "about 20% to 90% by weight". Column 10, line 35, "(a)2-Bis" should read "(a)2,7-Bis". Column 14, Example 24, Challenge "40 $LD_{50}$" should read Challenge "40 $ID_{50}$". Claim 11, line 1, "wherein the is" should read "wherein the compound is".

Signed and Sealed this

Ninth Day of May 1978

[SEAL]

Attest:

RUTH C. MASON
Attesting Officer

LUTRELLE F. PARKER
Acting Commissioner of Patents and Trademarks